(12) United States Patent
Chauvet et al.

(10) Patent No.: US 12,381,443 B2
(45) Date of Patent: Aug. 5, 2025

(54) BRACKET FOR SUPPORTING AN ELECTRIC MOTOR AND METHOD FOR MANUFACTURING SUCH A BRACKET

(71) Applicant: Vibracoustic Nantes SAS, Carquefou (FR)

(72) Inventors: Ludovic Chauvet, Mauves sur Loire (FR); Franck Trimoreau, Nantes (FR); Vincent Le Corre, Le Bignon (FR)

(73) Assignee: Vibracoustic Nantes SAS, Carquefou (FR)

( * ) Notice: Subject to any disclaimer, the term of this patent is extended or adjusted under 35 U.S.C. 154(b) by 605 days.

(21) Appl. No.: 17/636,254

(22) PCT Filed: Aug. 26, 2020

(86) PCT No.: PCT/EP2020/073865
§ 371 (c)(1),
(2) Date: Feb. 17, 2022

(87) PCT Pub. No.: WO2021/037919
PCT Pub. Date: Mar. 4, 2021

(65) Prior Publication Data
US 2022/0294309 A1  Sep. 15, 2022

(30) Foreign Application Priority Data

Aug. 26, 2019 (EP) .................................... 19306031

(51) Int. Cl.
*H02K 5/24* (2006.01)
*B29C 65/02* (2006.01)
*B60K 1/00* (2006.01)

(52) U.S. Cl.
CPC ............... *H02K 5/24* (2013.01); *B29C 65/02* (2013.01); *B60K 1/00* (2013.01); *B60Y 2200/91* (2013.01);
(Continued)

(58) Field of Classification Search
CPC . H02K 5/24; B29C 65/02; B60K 1/00; B60Y 2410/122; B60Y 2410/124; B60Y 2200/91; B60Y 2400/60
(Continued)

(56) References Cited

U.S. PATENT DOCUMENTS

2004/0178028 A1  9/2004  Farmer et al.
2009/0273250 A1  11/2009  Huesges
(Continued)

FOREIGN PATENT DOCUMENTS

CN    101512875 A    8/2009
CN    109435659 A    3/2019
(Continued)

OTHER PUBLICATIONS

European Search Report, 19306031.6, dated Feb. 26, 2020.
(Continued)

*Primary Examiner* — Keith J Frisby
(74) *Attorney, Agent, or Firm* — Fishman Stewart PLLC

(57) ABSTRACT

The invention relates to a bracket for supporting an electric motor on a chassis of a vehicle. The bracket includes a first half shell defining a first half space and a second half shell defining a second half space. In embodiments, the first half shell and the second half shell are made from a plastic material, which may in particular comprise a polymer material. In embodiments, the first half shell and the second half shell are fixed to each other, such as by welding, such that the first half shell and the second half shell define a cavity within the bracket that includes the first half space and the second half space.

22 Claims, 7 Drawing Sheets

(52) U.S. Cl.
CPC ... *B60Y 2410/122* (2013.01); *B60Y 2410/124* (2013.01)

(58) Field of Classification Search
USPC .......................................... 180/312
See application file for complete search history.

(56) References Cited

U.S. PATENT DOCUMENTS

| | | | |
|---|---|---|---|
| 2011/0290980 A1* | 12/2011 | Bradshaw | F16F 1/3849 264/277 |
| 2017/0113533 A1 | 4/2017 | Abe et al. | |
| 2018/0238408 A1 | 8/2018 | Song | |
| 2022/0154794 A1* | 5/2022 | Johansson | B62D 7/222 |

FOREIGN PATENT DOCUMENTS

| | | | | |
|---|---|---|---|---|
| DE | 102012218686 A1 | | 4/2014 | |
| DE | 102013109352 A1 | | 3/2015 | |
| DE | 102014224996 A1 | * | 6/2016 | |
| DE | 102016201560 A1 | * | 8/2017 | ............. B60R 11/00 |
| EP | 1320172 A1 | * | 6/2003 | ........... F04D 29/668 |
| EP | 2527231 A2 | | 11/2012 | |
| EP | 3533644 A1 | | 9/2019 | |
| KR | 100488669 B1 | | 5/2005 | |

OTHER PUBLICATIONS

Korean Office Action, KR10-2022-7006732, dated Dec. 26, 2023 (w_translation).
Indian Examination Report for IN202217002597 May 8, 2023 (7 pages).
Chinese Office Action and Search Report, CN202080051738.4, dated dated Apr. 9, 2024 (with translation).
EPO Communication pursuant to Rule 71(3) EPC, EP19306031.6, dated Jun. 27, 2025.
Machine translation for DE102012218686A1.

* cited by examiner

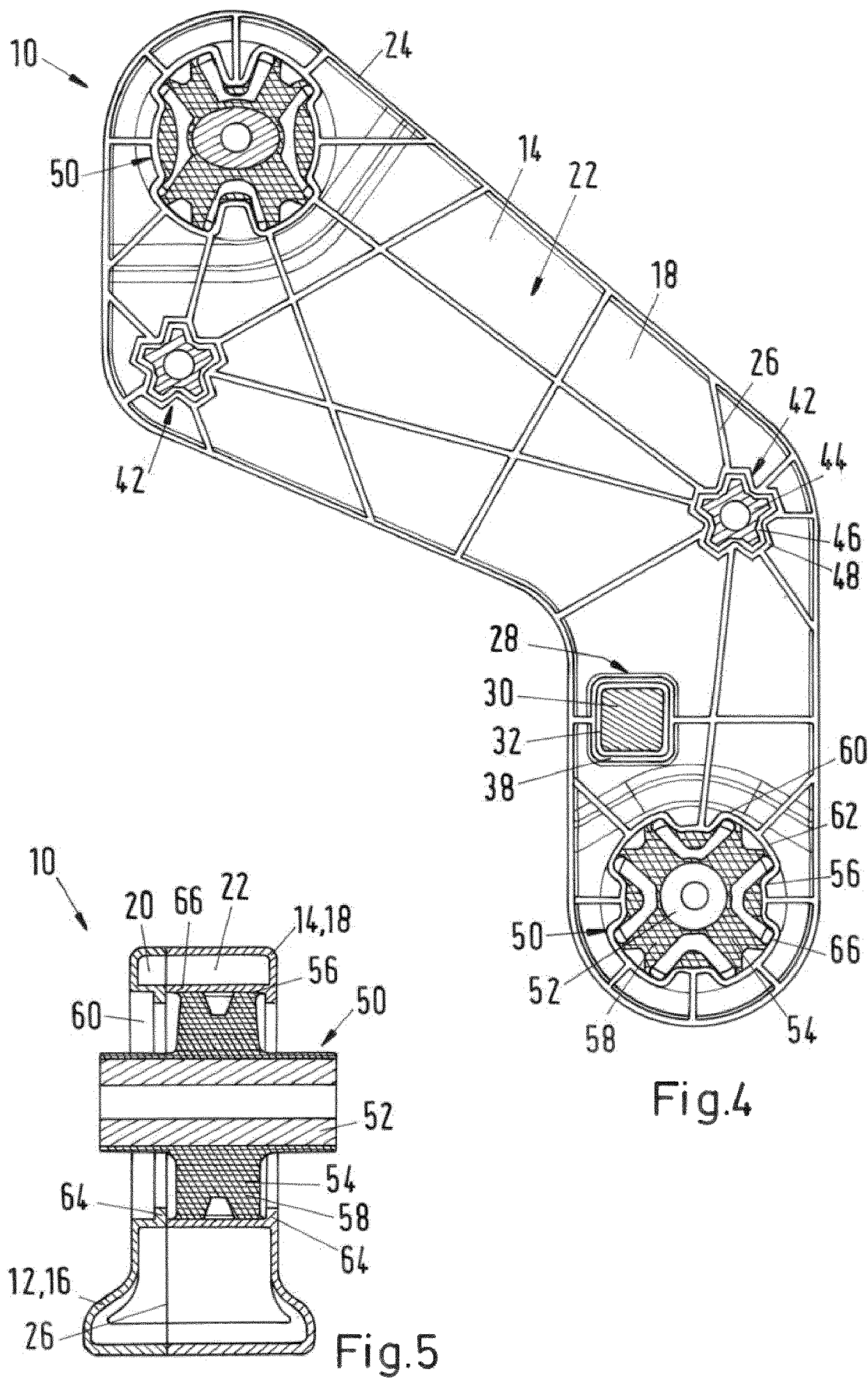

BRACKET FOR SUPPORTING AN ELECTRIC MOTOR AND METHOD FOR MANUFACTURING SUCH A BRACKET

CROSS-REFERENCE TO RELATED APPLICATIONS

This application is a National Stage Patent Application of International Patent Application No. PCT/EP2020/073865, filed Aug. 26, 2020, which claims the benefit of European Application Serial No. 19306031.6, filed Aug. 26, 2019, the contents of each are incorporated by reference in their entireties.

TECHNICAL FIELD

The invention relates to a bracket for supporting an electric motor on a chassis of a vehicle, wherein the bracket is made from a plastic material. The invention further relates to a method for manufacturing a bracket for supporting an electric motor on a chassis of a vehicle, whereby the bracket is made from a plastic material.

BACKGROUND

In recent years, the development of electric vehicles has made significant progress resulting in more and more electric vehicles on the streets. Electric motors for powering electric vehicles exhibit different ranges of vibration compared to common combustion engines. Consequently, means for supporting combustion engines cannot be employed for supporting electric motors while showing similar characteristics in respect to damping or absorption of vibrations. In particular, damping or absorbing vibrations generated by an electric motor cannot be reliably achieved with absorbers/dampers for combustion engines. Consequently, new supports for electric motors were developed, such as the one described in DE 10 2013 109 352 A1.

SUMMARY

It is an objective of the invention to provide a bracket for supporting an electric motor on a chassis of a vehicle, which provides a good dampening/absorption of the vibrations generated by an electric motor. A further objective is to provide a method for manufacturing such a bracket.

The objectives may be addressed by embodiments of the bracket and method disclosed herein.

A bracket for supporting an electric motor on a chassis of a vehicle comprises a first half shell defining a first half space and a second half shell defining a second half space. The first half shell and the second half shell are made from plastic material, in particular polymer material. The first half shell and the second half shell are fixed to each other, preferably by welding, such that the first half shell and the second half shell define a cavity within the bracket, wherein the cavity includes the first half space and the second half space.

A method for manufacturing a bracket for supporting an electric motor on a chassis of a vehicle comprises the following steps: manufacturing, preferably molding, a first half shell defining a first half space and a second half shell defining a second half space, wherein the first half shell and the second half shell are made from a plastic material; and fixing, preferably welding, the first half shell to the second half shell such that the first half shell and the second half shell define a cavity within the bracket, wherein the cavity includes the first half space and the second half space.

An assembly comprises the bracket as described above and the electric motor, wherein the bracket is attached to the electric motor for supporting the electric motor.

The bracket having a hollow body—defined by the cavity—in conjunction with being made from a plastic material allows a flexibility or resilience which is able to dampen and/or absorb vibrations of the electric motor in a range between 750 Hz and 2000 Hz. Consequently, the bracket itself by virtue of its chosen material in conjunction with its shape provides damping/absorption characteristics in a frequency range between 750 Hz and 2000 Hz. It is assumed that an electric motor provides structure-borne noise having frequencies in the range between 1 and 2000 Hz such that, by virtue of the chosen material and shape, approximately half of the generated frequency range can be dampened and/or absorbed by the bracket itself.

Furthermore, the bracket can be easily manufactured by means of manufacturing or molding two half shells which are fixed to each other. What is more, the bracket for supporting the electric motor is lightweight due to its cavity, while providing enough strength for supporting the considerable weight of an electric motor.

For manufacturing the bracket no screws or other fastening means are necessary, such that the assembly process of the bracket can be significantly simplified and the number of components for the bracket can be reduced.

The bracket for supporting an electric motor on a chassis of a vehicle can also be understood as a support, a mount or a means for supporting an electric motor on a chassis of a vehicle. The bracket may also be configured for receiving the torque load generated by the electric motor. The chassis is any component or part of the vehicle which is capable of bearing the weight of an electric motor.

The vehicle is preferably an electric vehicle or a hybrid vehicle comprising both an electric motor and a combustion engine. An electric vehicle is solely driven by the power generated by at least one electric motor. The electric motor is any electric motor which is capable of converting electric energy in a rotational movement. Any electric motor which is capable of powering an electric vehicle may be considered an electric motor in the understanding of this application. The electric motor in operation may generate (structure-borne) vibrations in the frequency range between 1 and 2000 Hz. The electric motor or a plurality of electric motors are preferably provided for powering the vehicle, i.e. for providing the power for driving the vehicle.

The bracket preferably may consist only of a first half shell and of a second half shell. The first half shell defines a first half space. The first half space is a space which is only open in one direction. The first half space may be open in only one plane, such that the first half space is closed by a first surface provided by the first half space which may span a solid angle of 180°. Similarly, the second half shell also may be only open at one plane such that the second half space is defined by a second surface provided by the second half shell which may also cover a solid angle of 180°.

The bracket is manufactured by attaching the first half shell and the second half shell such that the respective open parts of the first half shell and the second half shell are brought in contact with each other. This means that once the bracket is completely manufactured, the first half space and the second half space are in communication with each other and the cavity provided within the bracket is defined by the first half shell and the second half shell. In particular, the first surface of the first half shell and the second surface of the second half shell (solely) define the cavity. The first half shell and/or the second half shell may exhibit a convex shape.

The first half shell and the second half shell may be identical to each other except for their chirality. This means, the first half shell and the second half shell are similar to each other like the right hand and the left hand. This simplifies the manufacturing process, as the molding casts for molding the first half shell and the second half shell can be made similar to each other.

However, it is also possible that the first half shell and the second half shell differ in their configuration. For example, the second half shell provides the main structure of the bracket, while the first half shell is basically a lid for closing the second half shell. In this context, the first half space may be defined by a convex shape of the first half shell.

The first half shell and the second half shell are preferably fixed to each other along a line surrounding the open plane of the respective half spaces, i.e. which is adjacent to the second half space and the first half space, respectively. The first half shell and the second half shell are preferably fixed to each other by welding, in particular hot-gas welding, however, other means such as adhesion are possible. It is also possible that the second half space of the second half shell is inter alia defined by a wall surrounding the second half space. The first half shell may be configured as planar or convex first surface (which does not include the wall as the second half shell) is fixed to the wall of the second half shell.

The first half shell and the second half shell may each include a contact area surrounding the open plane of the first half space and the second half space, respectively. The first half space and the second half space are fixed to each other at the contact area. The contact area may be a line or strip, for example an end surface of the wall described above.

The first half shell and/or the second half shell may have an L-shaped configuration, such that the bracket also has an L-shaped configuration. However, other shapes are possible. The shape of the bracket depends on the shape of the electric motor as well as the chassis. The shape of the bracket is adapted for an optimal support of the electric motor on the chassis.

The first half shell and the second half shell are made from a rigid plastic material. In particular, the first half shell and the second half shell are made from the same plastic material. The plastic material may be a polymer plastic material which could be fiber-reinforced, in particular by short glass fibers. The first half shell and/or the second half shell can be made from a thermoplastic material optionally reinforced with short glass fibers or a thermoplastic material optionally reinforced with continuous fibers. The particular material as well as the final shape of the bracket are chosen and designed such that an optimal damping characteristic of the structure-borne noise can be achieved in a frequency range between 750 and 2000 Hz. The first half shell and the second half shell are preferably attached to each other by hot gas welding.

It is preferred that the first half shell and/or the second half shell are reinforced by ribs, wherein preferably the ribs are formed as one piece with the first half shell and/or the second half shell.

The ribs preferably increase the strength and/or stiffness of the assembled bracket. The ribs preferably reinforce the first surface and/or the second surface. In particular, as the bracket is a hollow member, the ribs help to provide the required strength while minimizing the weight of the bracket. The ribs may separate the first half space and/or the second half space in sub-compartments. The ribs may be solely arranged at the first half shell or the second half shell, for example if one of the half shells is designed as a "lid".

The ribs preferably extend in (straight) lines. The number, arrangement, thickness and/or orientation of the ribs is preferably made such that an optimum strength of the bracket can be achieved for supporting the electric motor on the chassis. Consequently, the parameters defining the ribs strongly depend on the shape, weight distribution and/or weight of the electric motor to be supported on the chassis. The ribs may be determined by using simulation programs for computing the optimum arrangement of the ribs.

The ribs may be a separate element from the first half shell and/or the second half shell. In a preferred embodiment, the ribs are a unitary piece with the first half shell and/or the second half shell. The ribs are preferably manufactured in the same molding step as the first half shell and the second half shell. However, it is possible that the ribs are manufactured in a separate manufacturing step and subsequently attached to the first half shell and/or the second half shell, for example by welding. The ribs may be made from the same material as the first half shell and/or the second half shell, in particular from a thermoplastic material optionally reinforced by short glass fibers. It is preferred that both the first half shell and the second half shell comprise the ribs. However, it is possible that only the first half shell or only the second half shell comprise ribs.

The ribs are preferably arranged solely in the respective first half space and the second half space such that they do not protrude from the first half shell and the second half shell in the direction towards the respective other half shell. For example, the depth of the ribs corresponds to the depth of the first half shell and/or the second half shell. It is possible that the ribs of one half shell contact the ribs of the respective other half shell upon fixation of the first half shell to the second half shell.

It is preferred that the bracket comprises a damper, preferably arranged in the cavity, wherein further preferably the damper comprises an oscillating mass and a first resilient member attached to the bracket and the oscillating mass.

Preferably, the damper comprises an oscillating mass and a first resilient member arranged between the bracket and the oscillating mass. The damper is preferably provided for absorbing/dampening vibrations which originate from the electric motor. In particular, the damper is provided for shifting or reducing the eigenfrequency of the bracket which are induced by the vibrations generated by the electric motor. The damper is preferably provided at the location at which the bracket shows the highest eigenmode amplitude. This location may be computed using simulations or can be measured using a prototype bracket. The damper is preferably provided for dampening/absorbing vibrations in the frequency range between 400 Hz and 750 Hz which are generated by the electric motor.

The oscillating mass may be a metal part. Generally, the oscillating mass is made from a material that is heavier, i.e. has a higher density than the material of the bracket. The oscillating mass oscillates with respect to the bracket by virtue of the first resilient member. The first resilient member is arranged between the oscillating mass and the bracket. For example, the oscillating mass is attached to the bracket by means of the first resilient member. Therefore, the oscillating mass acts as a mass which can oscillate against the bracket for absorbing vibrations or shifting the eigenfrequency of the bracket itself.

It is preferred that the first resilient member is made from an elastic material, wherein preferably the first resilient member comprises a layer which surrounds the oscillating mass.

The elastic material of the first resilient member may be a thermoplastic elastomer (TPE), which is shaped as a layer. Preferably, the oscillating mass has a shape of a cube or cuboid. The first resilient member is preferably arranged on at least two opposing sides of the oscillating mass. Preferably, the first resilient member completely surrounds the oscillating mass.

In a preferred embodiment, the first resilient member has a two-part structure. The first resilient member may comprise a first part and a second part separate from the first part. The first part of the resilient member may surround the oscillating mass at all sides except for one side. For example, in case of a cubical oscillating mass, the first part of the first resilient member covers five sides of the cubical oscillating mass.

The second part of the first resilient member covers that side of the oscillating mass which is not covered by the first part of the first resilient member. Consequently, it is possible to insert the oscillating mass into the first part of the first resilient member. In a second step, the side not covered by the first resilient member is covered by the second part of the first resilient member. In this way, it is possible that the oscillating mass is not fixed to the first resilient member, but is solely held in a form-locked manner.

It is preferred that the first resilient member is arranged between the oscillating mass and a damper wall which is formed as one piece with the first half shell and/or the second half shell, wherein preferably a part of the first resilient member and the second half shell are simultaneously manufactured in the dual injection process.

The part of the first resilient member which is simultaneously manufactured in a dual injection process with the second half shell may be the first part as described above. The second part may be manufactured in a different molding process or is simultaneously manufactured in a dual injection process with the first half shell. In the latter case, the second part of the first resilient member is fixed to the first half shell. Consequently, the oscillating mass may be positively locked within the bracket upon fixing the first half shell to the second half shell.

The damper wall may protrude from the second surface of the second half shell into the second half space. This means that the damper wall is arranged in the cavity of the bracket. The damper wall may be configured as a portion of the ribs. Furthermore, the damper wall may have the same configuration as the ribs, but is arranged separate or instead of a rib. In a preferred embodiment, the damper wall intersects the linear extension of a rib.

For example, the damper wall surrounds the oscillating mass from four sides, while the second surface of the second half shell covers the oscillating mass from a fifth side. Generally speaking, the damper wall in conjunction with the second half shell provides a half space in which the oscillating mass is arranged. In particular, the oscillating mass can oscillate by means of the resilient member in the half space defined by the damper wall and the second surface.

The oscillating mass is held in the bracket in a form-locking way by closing the sixth side or the open side of the half space defined by the damper wall and the second surface by arranging the first half shell on the second half shell. Upon attaching the first half shell on the second half shell, the second part of the first resilient member is arranged on the oscillating mass between the oscillating mass and the first half shell.

The first half shell optionally comprises a pocket. A bottom of the pocket as well as the damper wall define a space in which the damper is positively locked. The pocket may form a plateau in the first half space for closing the space defined by the damper wall. The second part of the first resilient member may be attached to the bottom of the pocket. The first half shell including the pocket as well as the second part of the first resilient member may be made in a dual-injection process. The pocket may be omitted; the first outer surface may act as a wall for positively locking the damper in the damper wall.

It is preferred that the bracket comprises at least one isolation bushing for attaching the electric motor to the bracket, wherein preferably the isolation bushing comprises a body made from a rigid material to be connected to the electric motor and a second resilient member surrounding the body, wherein further preferably the second resilient member is arranged between the body and an inner surface of a first opening in the bracket.

The isolation bushing is provided for dampening/absorbing (structure-borne) vibrations in the frequency range between 100 and 400 Hz. The damping/absorbing characteristics are achieved by means of the mass of the electric motor which is resiliently mounted to the bracket. Consequently, the mass of the electric motor acts as a damper/absorber. Optionally, the bracket is solely fixed to the electric motor via the isolation bushings.

The body made from a rigid material is provided for the attachment of the electric motor to the bracket. For example, the body may be an elongated member having a through-hole along its axial extension for inserting a bolt or screw with which the electric motor can be attached to the bracket. In other embodiments, the body may be an elongated member which protrudes from the bracket on which the electric motor can be mounted. The body may have in a cross-sectional view a circular configuration or a star-shaped configuration.

The second resilient member is arranged between the body and the bracket for providing resilient movement between the bracket and the body. In particular, at least one first opening is arranged in the bracket which means that both the first half shell and the second half shell comprise a respective part of the first opening at the same location, such that the body can be inserted into the first opening through the first half shell as well as the second half shell. The body may be made from a metal material or from a material which is identical to the material of the first half shell and/or the second half shell.

The material of the second resilient member may also be TPE. The second resilient member may also be configured as a layer surrounding the body. The second resilient member may be fixedly attached to an inner surface of the first opening. It is preferred that two or more first openings and consequently two or more isolation bushings are provided for supporting the electric motor on the bracket. The first opening may be star-shaped in a cross-sectional view, however other shapes are possible.

The thickness as well as the configuration of the body and the second resilient member in a cross-sectional view is provided for achieving optimal damping/absorbing characteristics. Since the weight of the electric motor lies on the first isolation bushings, it is preferred that the ribs are in connection with the first opening. The inner surface of the first opening may be a unitary body with the first half shell and/or the second half shell.

It is preferred that the second resilient member and the second half shell are simultaneously manufactured in a dual injection process.

This significantly reduces the manufacturing steps. The body may be inserted into the opening in the second resilient member after the manufacturing process or after the first half shell and the second half shell are fixed to each other. The second resilient member may be a layer arranged around the inner surface of the first opening. The second resilient member may completely surround the inner surface of the first opening or may be arranged at angular portions of the inner surface of the first opening.

In a preferred embodiment, the inner surface of the first opening is solely provided by the second half shell. The wall defining the first opening at the second half shell may protrude from the second half shell. In particular, the first opening at the first half shell does not include a wall structure but is merely a through-hole in the first surface. The wall defining the first opening at the second half shell may extend up to the first surface when the first half shell is fixed to the second half shell. In this case, the second resilient member can be completely manufactured in a dual-injection process with the second half shell.

The wall of the first opening may be a unitary piece with the first half shell and/or the second half shell. The first half shell and the second half shell optionally contact each other at the respective walls of the first opening when the first half shell is fixed to the second half shell, such that the walls of the first opening provided by the first half shell and the second half shell form a continuously inner surface of the second opening.

It is preferred that the bracket comprises at least one attachment bushing for attaching the bracket to the chassis, wherein preferably the bracket comprises a second opening which includes protrusions arranged at axial ends of the second opening and extending into the second opening for positively locking the attachment bushing into the second opening upon fixing the first half shell to the second half shell.

The attachment bushing is provided for damping (structure-borne) vibrations in the range between 1 Hz and 100 Hz. The attachment bushing may also be called a rubber bushing.

The attachment bushing is used for attaching the bracket to the chassis. To this end, the bracket comprises the second opening in which the attachment bushing is arranged. Two or more attachment bushings and second openings may be provided depending on the shape of the bracket and the weight distribution of the electric motor. Optionally, the bracket is solely fixed to the chassis via the attachment bushings.

The first half shell and the second half shell preferably each comprise a portion of the second opening. The second opening may be formed by a bushing wall which extends along the perimeter of the second opening. The second opening may be circular in a cross-sectional view, however other shapes are possible.

The bushing wall may be a unitary piece with the first half shell and/or the second half shell. The bushing wall of the first half shell and of the second half shell optionally contact each other when the first half shell is fixed to the second half shell, such that the bushing walls form a continuously inner surface of the second opening.

The bushing wall may be a unitary piece with solely the second half shell or the first half shell; this means the bushing wall is provide solely by one of the first or second half shells. The other one of the first and second half shells may solely include a through-hole at the location of the second opening, wherein the through-hole has an inner surface structure which acts as the protrusion on the axial end at the respective half shell. For example, a diameter of the inner surface structure may be smaller than the outer diameter of the attachment bushing. It is also possible that the respective other half shell has a reduced thickness at the location of the second opening; for example, the respective half space does extend around the second opening.

The protrusions may be arranged at the second opening of both the first and second half shell. In particular, the protrusions are arranged at the axial ends which may be arranged flush to the first and second outer surfaces, respectively. It is also possible that the protrusions are arranged adjacent to the first and/or second outer surface.

The protrusions may be formed as a rib circumferentially extending along the inner surface of the second opening or as one or more projections which are preferably equidistantly distributed along the perimeter. The protrusion may be a unitary piece with the first half shell and/or the second half shell. The protrusion has such an extension in the radial direction that the attachment bushing cannot move over the protrusion in the axial direction. For example, the inner diameter of the protrusion is smaller than the outer diameter of the attachment bushing at a respective location along the perimeter.

As the protrusions are arranged at both axial ends of the second opening at the first half shell as well as the second half shell, the attachment bushing is positively locked within the second opening upon fixing the first half shell to the second half shell. Consequently, there are no additional means necessary for fixing the attachment bushing to the bracket. In particular, it is not necessary to use adhesion or bonding agent for fixing the attachment bushing to the bracket. However, a bonding agent may be used for fixing the attachment bushing to the bracket, for example for increasing the strength or durability of the connection between the attachment bushing and the bracket.

The attachment bushing may be manufactured in a separate step with respect to the molding process of the first half shell and the second half shell. It is solely necessary to plug the attachment bushing into the second opening formed in the first half shell or the second half shell.

The inner surface of the second opening may have a shape which is adapted to the shape of the attachment bushing, i.e. the shape of the inner surface in a cross-sectional view deviates from a circular configuration.

It is preferred that the attachment bushing comprises a sleeve to be connected to the chassis and a rubber member surrounding the sleeve, wherein preferably the sleeve is made from a rigid material, preferably a plastic material.

The sleeve may be an elongated member, which preferably is connected to the chassis. The sleeve may comprise a through-hole extending in the axial direction of the sleeve into which a bolt or screw can be inserted for fixing the sleeve and, hence, the bracket to the chassis. The sleeve may be made from a rigid material, such as a plastic material, preferably from the same plastic material as the bracket. Alternatively, the sleeve may be made from a metal material.

The rubber member is preferably made from a rubber material. It is also possible that the rubber member is made from TPE and/or that the rubber member is manufactured in a dual injection process together with the first half shell and/or the second half shell. The rubber member is the resilient part of the attachment bushing which is provided for dampening/absorbing vibrations which are generated by the electric motor and transmitted via the bracket to the attachment bushing.

The sleeve may have a cylindrical outer surface. However, other shapes of the sleeve are possible. The rubber member may surround the sleeve over the whole circumference of the sleeve. The rubber member may be only attached at a portion of the sleeve which is arranged in the second opening. The sleeve may protrude from the bracket at one or both sides of the bracket. The sleeve can also be flush with the first and/or second outer surface. The rubber member may be fixed to the sleeve, for example by vulcanizing the rubber member to the sleeve. The sleeve and the rubber member may be manufactured in a separate manufacturing step.

It is preferred that the bracket comprises at least two attachment bushings each arranged in the respective second openings, wherein preferably the at least two attachment bushings differ in their shape and/or material.

The two second openings and the two attachment bushings may be arranged at opposite sides of the brackets. Due to the weight distribution of the electric motor or due to the arrangement of the bracket, it is possible that the load acting on the two attachment bushings differ. In order to address this difference in load, the two attachment bushings differ in their configuration, in particular in their shape and/or material. For example, the one attachment bushing which is subjected to a lower load comprises a configuration, for example a material, which provides a lower stiffness compared to the other attachment bushing which is subjected to a higher load. By such a design, it can be achieved that the damping characteristics of the both attachment bushings is similar irrespective of the load acting on the two attachment bushings. For example, one attachment bushing uses a material comprising a different stiffness. It is also possible that the thickness or volume of the rubber member differs from one attachment bushing to the other attachment bushing for assuring equal damping/absorbing characteristics.

It is preferred that the attachment bushing comprises at least one arm inserted into a radially extending recess of the second opening, wherein preferably the at least two attachment bushings differ in the orientation of the at least one arm.

The arm of the attachment bushing may project directly from the sleeve or the sleeve is completely surrounded by a portion of the rubber member in the circumferential direction from which the arm projects. It is preferred that three, four, five or six arms are present. The arms preferably have the same diameter and length, however they differ in their orientation. Due to the different orientation, the effective stiffness of the attachment bushing varies depending on the particular direction. In this way, it is possible to provide two different attachment bushings having a different stiffness in a particular direction, whereby the two attachment bushings may have a similar orientation. Due to the presence of the arms and recesses, the orientation of the attachment bushings in the recesses can be fixed.

The second opening may be provided with recesses distributed along the inner surface of the second opening for receiving the respective arms of the attachment bushing. In particular, the dimension of the recesses are adapted to the dimensions of the arms. It is preferred that the arms fully contact the inner surface of the recesses such that the arms contact the recesses along their radial extension and/or along the outer circumference. The arms may have a rectangular cross-section such that the recesses may also exhibit a rectangular cross-section.

The attachment bushing may comprise an outer sleeve which is arranged at the radial outer circumference of the rubber member. The outer sleeve may only be arranged at certain intervals along the outer circumference. For example, the outer sleeve may solely be arranged at the radially outer end of the arms. It is also possible that the outer sleeve extends around the whole perimeter of the rubber member. Part of the rubber member may be solely fixed to the sleeve or the outer sleeve.

It is preferred that the bracket comprises an acoustic insulation cover shaped to surround the electric motor, wherein the acoustic insulation cover is fixedly attached to the bracket.

The acoustic insulation cover is preferably provided for reducing airborne noise, whereas the bracket preferably having the above-mentioned components is provided for insulating structure-borne noise. In particular, the acoustic insulation cover is provided for insulating vibrations or noise having frequencies above 2000 Hz, which is recognizable as acoustic noise.

To this end, the acoustic insulation cover is shaped such that it surrounds the electric motor, in particular from all sides. Preferably, the acoustic insulation cover completely surrounds the electric motor in order to reduce any airborne noise. However, the acoustic insulation cover may include openings, through-holes or passages which are necessary for guiding axles or wires from the electric motor to the outside through the acoustic insulation cover. Furthermore, the acoustic insulation cover may be provided with openings for ventilation purposes. These holes may be filled with noise-reducing materials which reduce acoustic noise, but allow air to penetrate therethrough.

The acoustic insulation cover may be configured and shaped such that it follows the outer shape of the electric motor, i.e. there is no or little space between the electric motor and the acoustic insulation cover. In particular, it is possible that the acoustic insulation cover contacts the electric motor or is spaced apart. The acoustic insulation cover may be provided with mechanical means for dampening or canceling airborne noise.

The acoustic insulation cover is supported by the bracket. For example, it is possible that two brackets are provided with the acoustic insulation cover. For example, the acoustic insulation cover may be solely held by the brackets on the chassis. However, it is possible that further attachment means/attachment portions are provided with the acoustic insulation cover for supporting the acoustic insulation cover.

In particular, the bracket is fixedly attached to the acoustic insulation cover. The acoustic insulation cover may be mechanically fixed to the bracket, for example by means of fastening elements, such as bolts, screws, and the like, or by means of a snap-fit connection. Furthermore, the acoustic insulation cover may be fixedly attached to the bracket by means of adhesion or by means of welding. In particular, after attaching the bracket to the acoustic insulation cover, this assembly may be a one-piece component.

The advantage of fixedly attaching the acoustic insulation cover to the bracket is that due to the structure-borne noise or vibration damping capabilities of the bracket, the acoustic insulation cover is simultaneously decoupled from vibrations generated by the electric motor. Therefore, additional damping means for decoupling the acoustic insulation cover from the electric motor are not necessary.

It is preferred that the acoustic insulation cover includes a first insulation half shell and a second insulation half shell, wherein preferably the first insulation half shell and the first half shell are a one-piece unitary component; wherein further preferably the second insulation half shell is mechanically fixed to the first insulation half shell.

The configuration of the acoustic insulation cover as being made of two or more separate components, for example the first insulation half shell and a second insulation half shell, allows to arrange the electric motor in the inside of the acoustic insulation cover. This will be achieved in that the first insulation cover is arranged using the bracket at the chassis, the electric motor is attached to the bracket and, subsequently, the second insulation half shell is attached to the first insulation half shell.

In particular, the first and second insulation half shells are fixed to each other such that airborne noise may not leak at the place of contact between the first insulation half shell and the second insulation half shell. The first insulation half shell may be mechanically fixed to the second insulation half shell, for example, by the provision of fastening means, such as screws, bolts, and the like, and/or by a snap-fit connection. It is further possible that the first insulation half shell is fixed to the second insulation half shell by means of adhesion or welding.

When fastening elements are used for attaching the first insulation half shell to the second insulation half shell, one of the first and the second insulation half shells may be provided with tongues including bores which project over the respective other of the first and second insulation half shells, whereby at the same location as the bores of the tongues, further bores are provided, such that the fastening element may be guided therethrough.

The first insulation half shell and/or the second insulation half shell may each be a two-part component. For example, the first insulation half shell and/or the second insulation half shell may comprise a supporting member and an insulation member. The supporting member is made of a rigid material for providing stability and strength, whereby the insulation member is made from a material which is capable of absorbing, dampening or canceling airborne noise and/or dampening or absorbing vibrations of the respective supporting member.

The supporting member may be manufactured from a thermoplastic material optionally reinforced with glass fibers. The supporting member may be manufactured by thermoforming. The insulating member may be made from a polypropylene or by a natural fiber which has the advantage to make the insulating material recyclable. The supporting member and the insulating member may exhibit the same shape, such that the insulating member may be adhered or snap-fitted to the supporting member. It is also possible that the insulating member may cover only parts of the surface of the supporting member.

The insulating member may be arranged on the inside surface (the surface facing the electric motor) and/or the outside surface of the supporting member. In particular, it is possible that the insulating member is arranged on both sides of the supporting member.

The bracket, in particular the first half shell, and the acoustic insulation cover, in particular the first insulation half shell, preferably the supporting member, may be a unitary piece. In particular, the first insulation half shell and the first half shell of the bracket may be manufactured in a same injection process. Therefore, the insulation half shell (in particular the supporting member) and the half-shell of the bracket may be made from the same material.

It is preferred that the acoustic insulation cover includes an attachment portion for attaching the acoustic insulation cover to the chassis and/or to the electric motor, wherein preferably the attachment portion includes the insulation bushing and/or the attachment bushing.

The attachment portion is an element different to the bracket or the brackets, which is attached to the acoustic insulation cover in order to support the acoustic insulation cover on the chassis and/or the electric motor. The attachment portion may be made similar to the bracket, in particular regarding the material used and/or the structural configuration. For example, the attachment portion may also include ribs for increasing the strength of the attachment portion. The attachment portion may be mechanically fixed to the acoustic insulation cover or the attachment portion may be a unitary piece with the acoustic insulation cover, in particular the first insulation half shell, more in particular the supporting member.

The attachment portion may be fixed to the first insulation half shell and/or the second insulation half shell. The attachment portion may provide a connection between the chassis and the electric motor, while simultaneously supporting the acoustic insulation cover. The attachment portion may help to support torque generated by the electric motor acting on the brackets.

The attachment portion may include means for decoupling vibrations generated by the electric motor from the chassis. In particular, similar elements as described in conjunction with the bracket may be used for decoupling the electric motor from the chassis by the attachment portion. For example, the attachment portion may also include the insulation bushing as discussed above and/or the attachment portion as discussed above.

It is possible that the attachment portion may also include a first opening for receiving the insulation bushing and/or a second opening for receiving the attachment bushing. The shape and/or other configurations of the first and second opening of the attachment portion is similar to the ones of the bracket. The attachment portion may not exhibit a two-part structure of the bracket, namely by consisting of the first half shell and the second half shell. The attachment portion may be a unitary piece manufactured, for example molded, in one injection process.

All embodiments, preferred configurations and advantages discussed in conjunction with the bracket equally apply to the method for manufacturing the bracket.

It is preferred that step a) of the above mentioned method includes manufacturing a first resilient member of the damper together with the second half shell by means of a dual injection process, wherein preferably an oscillating member of the damper is attached to the first resilient member.

It is preferred that step a) of the above mentioned method includes providing at least one first opening in the first half shell and the second half shell, wherein an inner surface of the first opening is covered by a second resilient member, wherein preferably the second resilient member and the second half shell are manufactured in a dual injection process.

It is preferred that, prior to step b) of the above mentioned method, at least one attachment bushing for attaching the bracket to the chassis is inserted into a portion of the second opening, which is arranged in the first half shell and/or the second half shell, wherein preferably the second opening includes protrusions arranged at axial ends of the second opening and extending into the second opening for positively locking the attachment bushing into the second opening upon fixing the first half shell to the second half shell.

BRIEF DESCRIPTION OF THE DRAWINGS

Preferred embodiments of the invention will be discussed in conjunction with the accompanying drawings.

FIG. 4 shows a cross-sectional view of the bracket of FIG. 1;

FIG. 5 shows a cross-sectional view of an attachment bushing of the bracket of FIG. 1;

DETAILED DESCRIPTION

Figure 1:
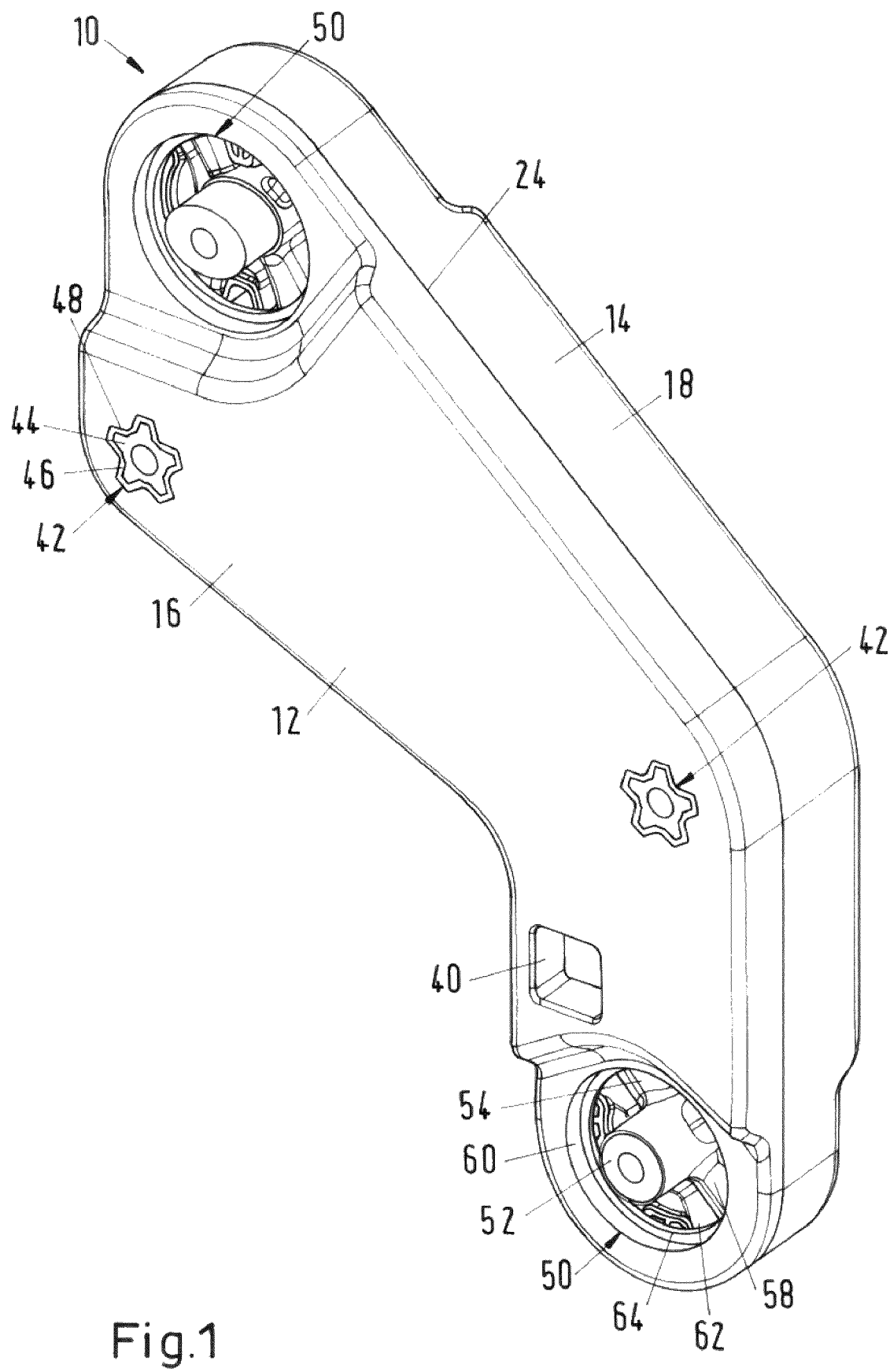
FIG. 1 shows a perspective view of a first embodiment of a bracket.

FIG. 1 shows a perspective view of a bracket 10 which is intended to be used for attaching an electric motor (not shown) to a chassis of a vehicle (not shown).

The bracket 10 comprises a first half shell 12 and a second half shell 14. The first half shell 12 and the second half shell 14 are preferably made from the same plastic material, preferably a glass fiber-reinforced polymer material, a thermoplastic material optionally reinforced with short glass fibers, or a thermoplastic material optionally reinforced with continuous fibers. The first half shell 12 comprises a first outer surface 16, while the second half shell 14 comprises a second outer surface 18. Upon attachment of the first half shell 14 to the second half shell 14, the outer surface of the bracket 10 is defined by the first outer surface 16 and the second outer surface 18.

Figure 2:
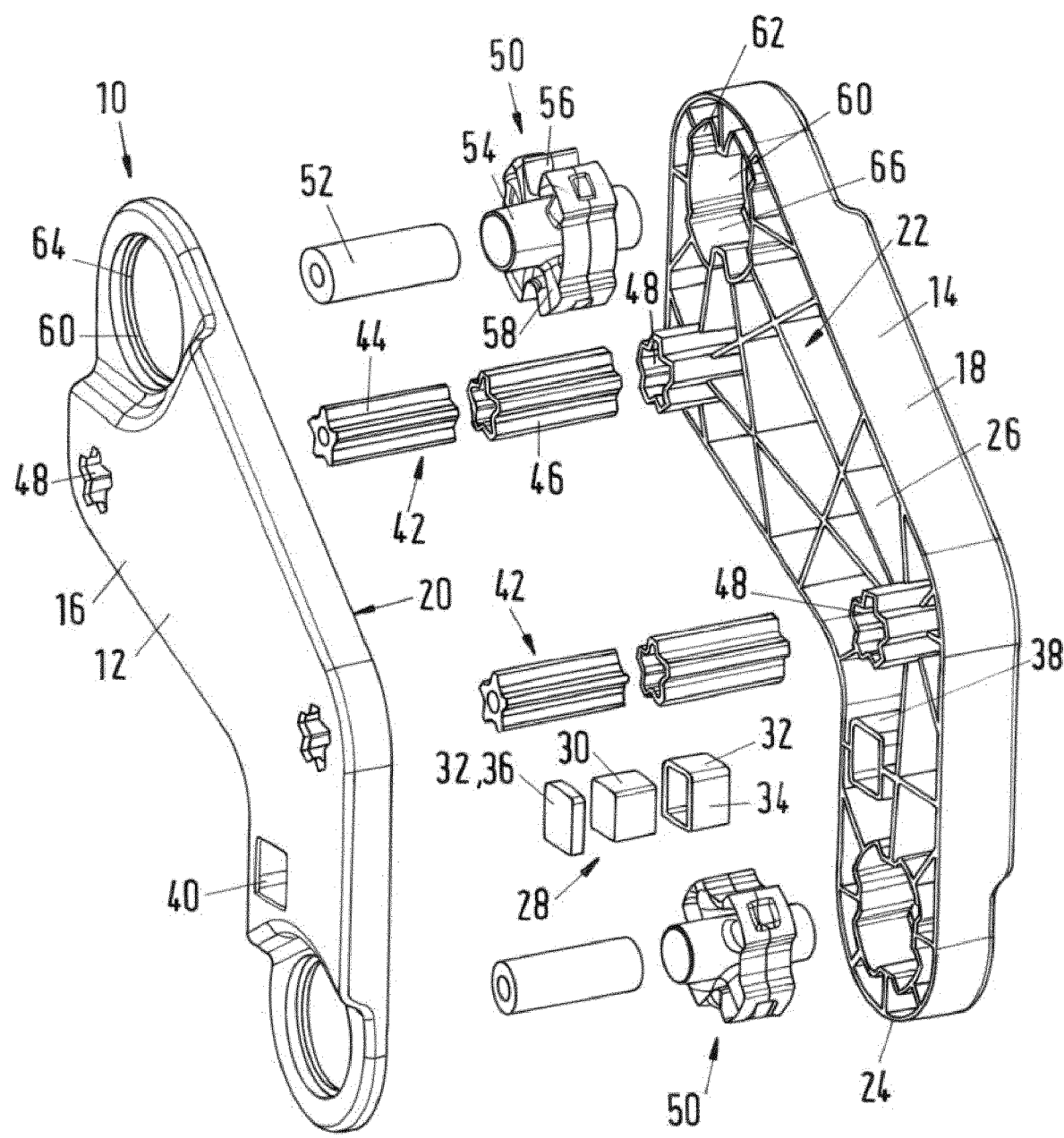
FIG. 2 shows an exploded view of the bracket of FIG. 1.
Figure 3:
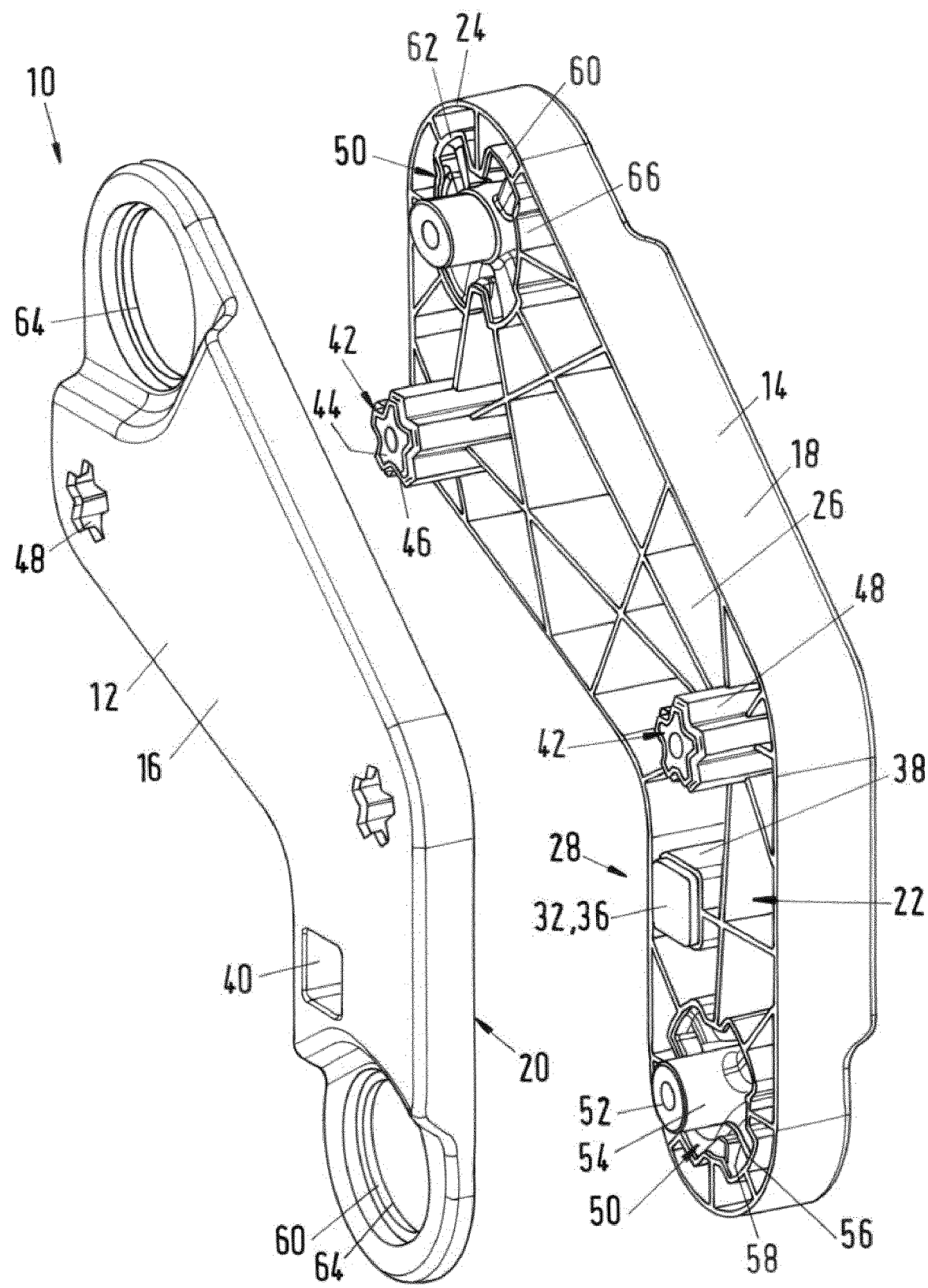
FIG. 3 shows a partly assembled view of the bracket of FIG. 1.

As visible from FIGS. 2, 3 and 4, the first outer surface 16 of the first half shell 12 defines a first half space 20, while the second outer surface 18 of the second half shell 14 defines a second half space 22. Consequently, the bracket 10 includes a cavity which is constituted by the first half space 20 and the second half space 22. The first half space 20 as well as the second half space 22 are open at a plane which is directed to the respective other of the first half shell 12 and the second half shell 14.

The respective planes are defined and surrounded by a contact area 24. The first half shell 12 and the second half shell 14 are fixed to each other at the contact area 24, preferably by hot gas welding. The contact area 24 may have the shape of a line (as shown in the FIGS. 2, 3 and 4) or of a strip. The contact area 24 may be an end face of the first half shell 12 and/or the second half shell 14.

The first half shell 12 and/or the second half shell 14 comprise a plurality of ribs 26. The ribs 26 may extend along straight lines. The ribs 26 protrude from the first outer surface 16 and/or the second outer surface 18 into the first half space 20 and the second half space 22, respectively. The depth of the ribs 26 is such that they do not protrude from the plane defined by the contact area 24. The ribs 26 may be a unitary piece with the first half shell 12 and/or the second half shell 14.

The bracket 10 optionally comprises a damper 28. As particularly visible from FIG. 2, the damper 28 comprises an oscillating mass 30 and a first resilient member 32. The damper 28 is preferably provided within the cavity of the bracket 10. The oscillating mass 30 is attached to the bracket 10 by means of the first resilient member 32. Consequently, the oscillating mass 30 may oscillate with regard to the bracket 10. The damper 28 is provided at that position of the bracket 10 which shows the highest amplitude of the eigenmode oscillation of the bracket 10. This position may be computed or determined by a testing routine. The damper 28 is provided for reducing the eigenvibration of the bracket 10 or for shifting the frequency of the eigenmode of the oscillation of the bracket 10.

The bracket 10 optionally comprises a damper 28. As particularly visible from FIG. 2, the damper 28 comprises an oscillating mass 30 and a first resilient member 32. The damper 28 is preferably provided within the cavity of the bracket 10. The oscillating mass 30 is attached to the bracket 10 by means of the first resilient member 32. Consequently, the oscillating mass 30 may oscillate with regard to the bracket 10. The damper 28 is provided at that position of the bracket 10 which shows the highest amplitude of the eigenmode oscillation of the bracket 10. This position may be computed or determined by a testing routine. The damper 28 is provided for reducing the eigenvibration of the bracket 10 or for shifting the frequency of the eigenmode of the oscillation the bracket 10.

The first resilient member 32 may comprise a first part 34 and a second part 36 separate from the first part 34. The oscillating mass 30 may be positively locked within the bracket 10. The first resilient member 32 may comprise a layer which surrounds the oscillating mass 30. For example, the first part 34 surrounds the oscillating mass 30 from five sides. The second part 36 of the first resilient member 32 may cover the oscillating mass 30 at the sixth side of the oscillating member 30.

The oscillating member 30 may be manufactured from a material which is heavier than the material of the bracket 10. For example, the oscillating mass 30 may be manufactured from metal. Since the first resilient member 32 completely surrounds the oscillating mass 30, the oscillating mass 30 may oscillate in any direction, while providing damping/absorbing characteristics.

The oscillating mass 30 may be fixed to the first resilient member 32 by bonding. However, it is preferred that the oscillating mass 30 is positively locked within the first resilient member 32. The damper 28 may be attached to the bracket 10 by adhesion or other means. It is also possible that the damper 28 is alternatively or additionally positively locked within the bracket 10.

For example, the second half shell 14 comprises a damper wall 38 and/or the first half shell 12 comprises a pocket 40. A bottom of the pocket 40 as well as the damper wall 38 define a space in which the damper 30 is positively locked. The damper wall 38 may be provided by the ribs 26. In the present case, the damper wall 38 intersects a rib 26. The damper wall 38 may have the same shape as the ribs 26. The pocket 40 may be omitted; the first outer surface 16 may act as a wall for positively locking the damper 28 in the damper wall 38.

The first part 34 of the first resilient member 32 may be simultaneously manufactured in a dual injection process with the second half shell 14. After manufacturing of the second half shell 14 and the first part 34 of the first resilient member 32, the oscillating mass 30 may be inserted into the first part 34 of the first resilient member 32. Subsequently, the second part 36 of the first resilient member 32 is placed on the that side of the oscillating member 30, upon which the first half shell 12 is attached to the second half shell 14, such that the bottom of the pocket 40 presses the second part 36 of the first resilient member 32 against the oscillating mass 30.

It is possible that the second part 36 of the first resilient member 32 is attached, for example bonded, to the bottom of the pocket 40. It is also possible that that the second part 36 of the first resilient member 32 is manufactured in a dual injection process of the first half shell 12. The first resilient member 32 may be made from a thermoplastic elastomer (TPE).

The bracket 10 optionally comprises at least one isolation bushing 42. In the present embodiment, two isolation bushings 42 are provided. The isolation bushing 42 provides a connection of the bracket 10 to the electric motor. The isolation bushing 42 may comprise a body 44 and a second resilient member 46. The body 44 can include an elongated member which may be made from a metal material or a rigid plastic material. The body 44 may comprise a through-hole in its axial direction for inserting a screw or bolt for attaching the electric motor to the bracket 10.

It is possible that the body 44 protrudes from the bracket 10 for attaching the electric motor. The body 44 may have a star-shaped outer surface in a cross-sectional view. However, other shapes of the outer surface in a cross-sectional view are possible.

The second resilient member 46 is formed as a layer between the body 44 and a first opening 48 of the bracket 10. The second resilient member 46 may also be made from TPE and preferably is manufactured in a dual injection process with the first half shell 12 and/or the second half shell 14. In particular, the first opening 48 arranged in the second half shell 14 protrudes from the second half space 22 towards the first half shell 12. Therefore, an inner surface of the first opening 48 is mostly or exclusively arranged at the second half shell 14, such that it is possible to completely manufacture the second resilient member 46 in a dual injection process with the second half shell 14. The first half shell 12 may only comprise a hole which allows to insert the isolation bushing 42, in particular the body 44.

The ribs 26 may originate from the first opening 48 in order to strengthen the first openings 48, as the weight of the electric motor is introduced into the bracket 10 by the first opening 48. The body 44 may be inserted into the second resilient member 46 which is already arranged in the first opening 48. This means that the body 44 is inserted in a subsequent step after the manufacturing of the second half shell 14 and the second resilient member 46.

The bracket 10 optionally comprises an attachment bushing 50. In the present embodiment, two attachment bushings 50 are provided. The attachment bushings 50 allow the attachment of the bracket 10 to the chassis.

The attachment bushing 50 may comprise a sleeve 52 and a rubber member 54. It is also possible that the attachment bushing 50 also includes an outer sleeve 56. The sleeve 52 is an elongated member which may include a through-hole along its axial extension. The through-hole is provided for inserting a bolt or a screw for attaching the bracket 10 to the chassis. The sleeve 52 may be manufactured from a metal or a plastic material.

The rubber member 54 is made from a resilient material, in particular a rubber material. The rubber member 54 is fixed to the sleeve 52, for example by vulcanization. As best seen in FIG. 4, the rubber member 54 comprises at least one arm 58, in the particular embodiment four arms 58. The rubber member 54 may completely surround the sleeve 52 in the circumferential direction, whereby the arms 58 protrude from that part of the rubber member 54 which is attached to the sleeve 52.

The outer sleeve 56 may be made from the same material as the sleeve 52, in particular a plastic material. The outer sleeve 56 surrounds the rubber member 54. Parts of the rubber member 54 may solely be attached to the outer sleeve 56, in particular in the areas between the arms 58. The tip end of the arms 58 may be attached to the outer sleeve 52. The outer sleeve 56 is provided for better inserting the attachment bushings 50 into a second opening 60 of the bracket 10.

The bracket 10 has in the shown embodiment two second openings 60. The second opening 60 is provided at both the first half shell 12 and the second half shell 14. However, the entire inner surface of the second opening 60 is solely provided at the second half shell 14. The first half shell 12 may exhibit a reduced thickness around the second opening 60 such that the second opening at the first half shell 12 may solely be a through-hole. It is also possible that the inner surface of the second opening 60 is provided by the first half shell 12 and the second half shell 14.

The inner surface of the second opening 60 comprises several recesses 62 which are provided for receiving the arms 58 of the attachment bushing 50. The second opening 60 is provided with protrusions 64 at its axial ends. As better seen in FIG. 5, the protrusions 64 radially extend from the inner surface of the second opening 60 inwards. As the inner surface of the second opening 60 is solely provided with the second half shell 14 in one embodiment, the second opening 60 of the first half shell 12 solely includes the protrusion 64.

The protrusion 64 may be configured as a rib extending over the whole inner circumference of the second opening 60. However, it is possible that the protrusion 64 is provided by a plurality of protrusions arranged at the second opening 60. As visible from FIG. 5, the protrusions 64 are arranged at the axial ends of the second opening 60. The protrusions 64 protrude from the inner surface of the second opening 60 radially inwards at such a length that the attachment bushing 50 is positively locked within the second opening 60 of the bracket 10 between the protrusions 64.

The second opening 60 of the second half shell 14 may be provided by a bushing wall 66 which may be configured similar to the ribs 26. The bushing wall 66 may be reinforced by ribs 26, for example that ribs 26 originate or terminate from the second opening 60, i.e. the bushing wall 66. The bushing wall 66 may be a unitary piece with the second half shell 14. As discussed above, the entire bushing wall 66 may be provided by the second half shell 14.

Figure 6:
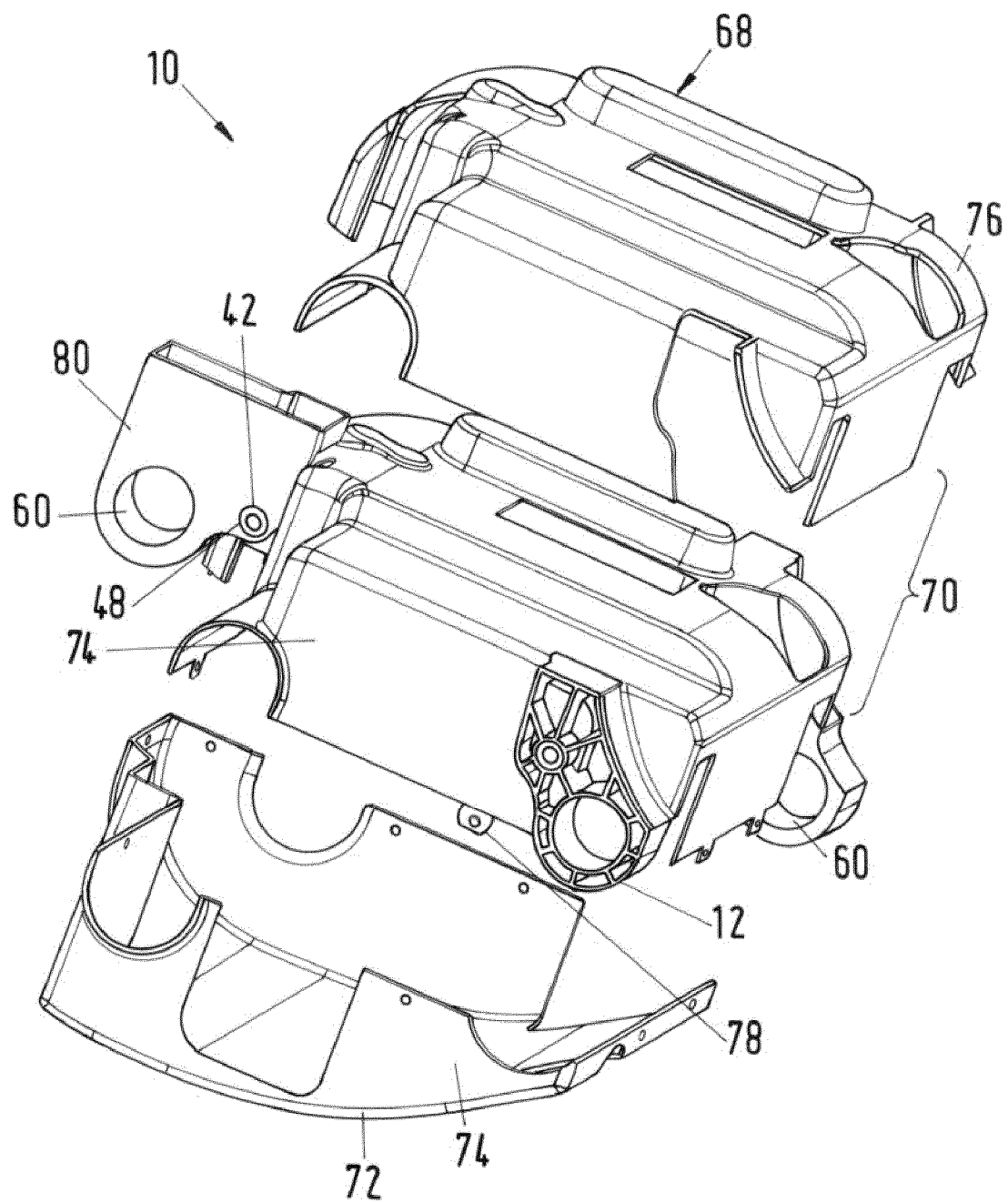
FIG. 6 shows an explosive view of a first half shell of a second embodiment of a bracket having an acoustic insulation cover.

The second opening 60 of the first half shell 12 may solely by a through-hole, whereby the protrusion 64 on the axial end at the first half shell 12 can be constituted by a reduced diameter of the through-hole (see FIG. 6). In particular, the inner diameter of the through-hole (second opening 60 at the first half shell 12) is less than the outer diameter of the attachment bushing 50.

The attachment bushing 50 may be manufactured in a separate manufacturing process. The attachment bushing 50 may be inserted into the second opening 60 of the second half shell 14. After that, the first half shell 12 is fixed to the second half shell 14, such that the attachment bushing 50 is positively locked in the second opening 60 by means of the protrusions 64. Consequently, no adhesion or further attachment means are necessary for fixing the attachment bushing 50 to the bracket 10.

A further embodiment of the bracket 10 is discussed in conjunction with FIGS. 6 to 9. The bracket 10 has a similar configuration as the bracket 10 described above except the following differences. Please note that FIGS. 6 to 9 only show the first half shell 12 of the bracket 10. The second half shell 14 (not shown in FIGS. 6 to 9) may be identical to the second half shell 14 of the embodiment shown in FIGS. 1 to 5.

The bracket 10 includes an acoustic insulation cover 68. In fact, two brackets 10 are attached to the acoustic insulation cover 68. The brackets 10 are fixedly attached to the acoustic insulation cover 68. The acoustic insulation cover 68 is configured and shaped for surrounding the electric motor (not shown in the figures). The acoustic insulation cover 68 is provided for reducing, damping, and/or canceling airborne noise having frequencies above 2000 Hz. The bracket 10 is provided for reducing, dampening and/or canceling structure-borne noise having frequencies below 2000 Hz.

The acoustic insulation cover 68 may be in contact with the electric motor or spaced apart thereto. It is also possible that the acoustic insulation cover 68 is partly in contact with the electric motor and partly spaced apart thereto. As visible from FIGS. 6 to 9, the acoustic insulation cover 68 is formed and shaped to follow the outer contour of the electric motor. In order to achieve good noise insulation capabilities, the acoustic insulation cover 68 is preferably shaped to completely surround the electric motor. However, as visible in FIGS. 6 to 9, the acoustic insulation cover 68 may include through-holes and/or openings which may be used to guide axles or wires from the electric motor through the acoustic insulation cover 68. Furthermore, ventilation holes may also be provided for releasing heat generated by the electric motor.

The acoustic insulation cover 68 comprises a first insulation half shell 70 and a second insulation half shell 72. The first insulation half shell 70 and/or the second insulation half shell 72 can include a supporting member 74 and an insulating member 76. In the embodiment shown in the figures, only the first insulation half shell 70 includes a supporting member 74 and an insulating member 76. The second insulation half shell 72 solely consists of the supporting member 74.

Each of the supporting members 74 provides stability and strength to the acoustic insulation cover 68. The supporting members 74 may be fabricated from a thermoplastic material reinforced with short glass fibers. The insulating member 76 may be made from polypropylene and is provided for reducing and damping airborne noise as well as structure-borne noise. In particular, the insulating member 76 is formed and shaped as the supporting member 74 of the first insulation half shell 70. The insulating member 76 may completely cover the outer surface (the surface not facing the electric motor) of the supporting member 74 of the first insulation half shell 70. The insulating member 76 may be fixed to the supporting member 74 by means of adhesion. As the insulating member 76 is of a material capable of damping vibrations, the insulating member 76 reduces the vibrations of the supporting member 74 and is capable of absorbing airborne noise generated by the electric motor.

The supporting member 74 of the first insulation half shell 70 is a unitary piece with the first half shell 12 of the bracket 10. The supporting member 74 may be made with the first half shell 12 of the bracket 10 in one injection molding process. This means that the acoustic insulation cover 68 is supported by the bracket 10, such that vibrations generated by the electric motor are damped by the bracket 10 and are not transmitted to the acoustic insulation cover 68.

Figure 7:
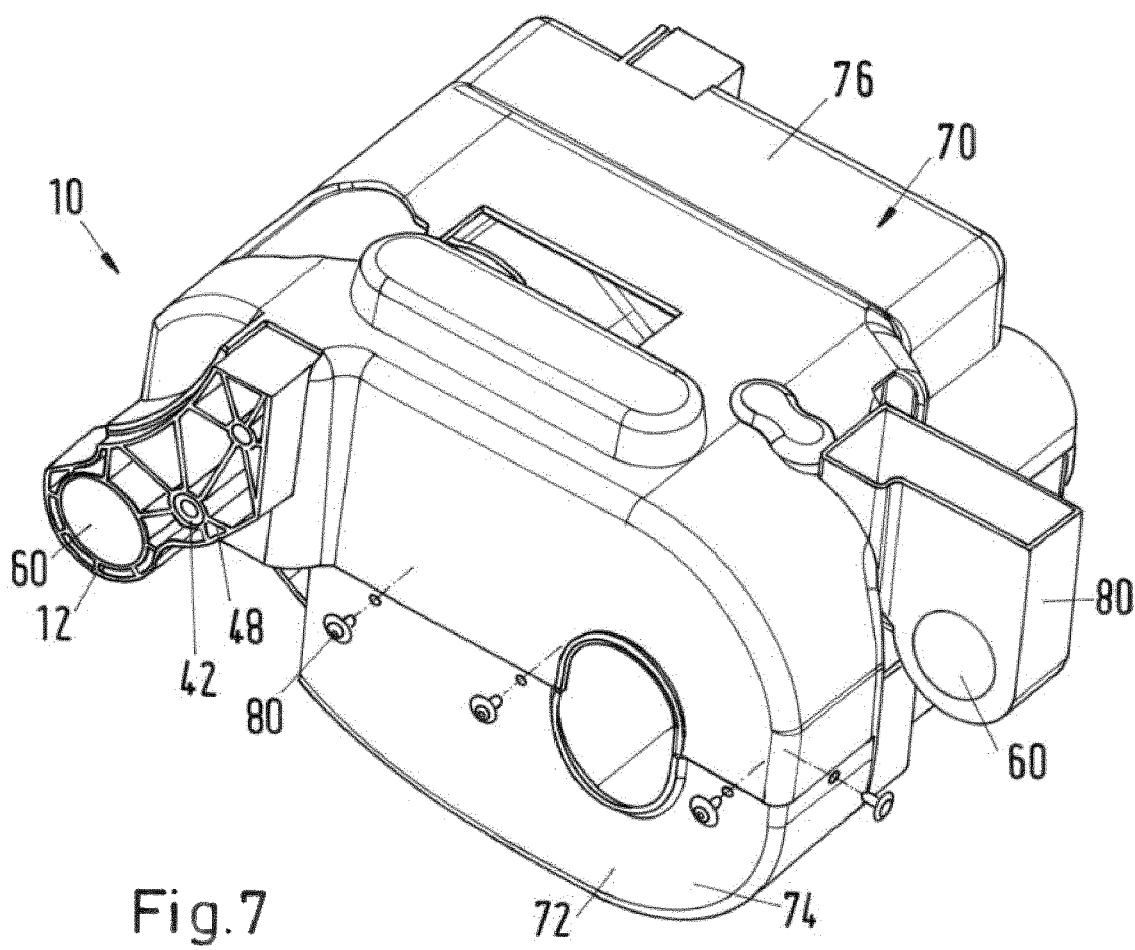
FIG. 7 shows a perspective view of an assembled configuration of the components of FIG. 6.
Figure 8:
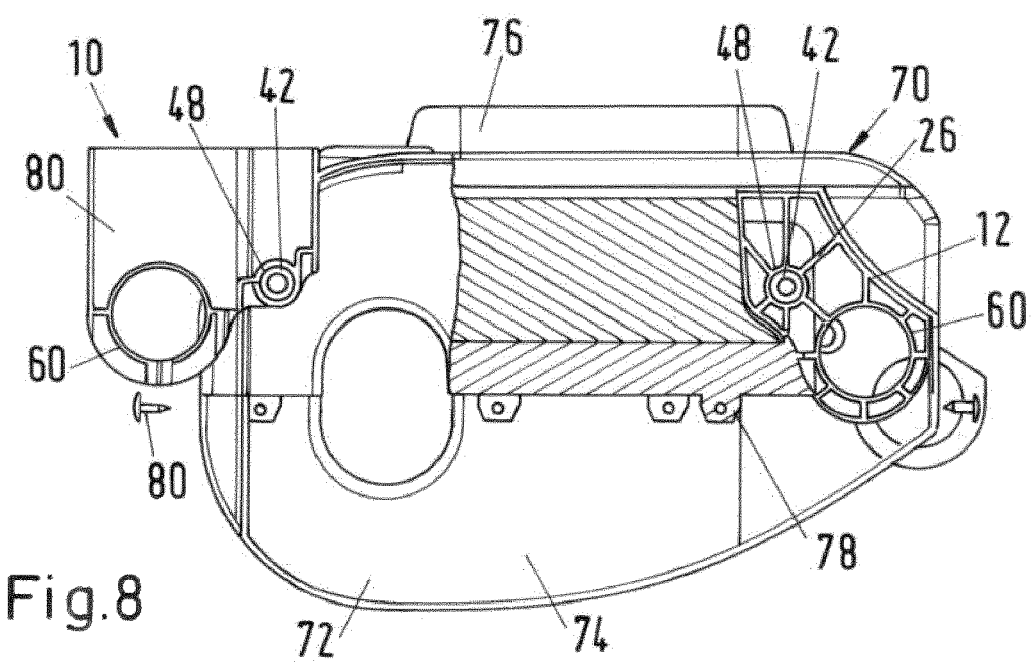
FIG. 8 shows a side view of the components of FIG. 7.

The supporting members 74 of the first insulation half shell 70 and of the second insulation half shell 72 are preferably attached mechanically to each other. To this end, the supporting member 74 of the first insulation half shell 70 includes a plurality of tongues 78 protruding in the direction of the second insulation half shell 72. The tongues 78 include bores which are coaxially aligned with bores in the second insulation half shell 72 upon attaching the second insulation half shell 72 to the first insulation half shell 70 as seen in FIG. 7.

The acoustic insulation cover 68 may further comprise an attachment portion 80. The attachment portion 80 may be a unitary piece with the supporting member 74 of the first insulation half shell 70. The attachment portion 80 is provided for attaching the acoustic insulation cover 68 to the electric motor and/or to the chassis.

In the embodiment shown in FIGS. 6 to 9, the attachment portion 80 is configured to be connected to both the chassis as well as the electric motor. The attachment of the attachment portion 80 to the electric motor and the chassis is similar to the one of the brackets 10. The attachment portion 80 may include a first opening 48 in which the insulation bushing 42 can be inserted as, for example, shown in FIG. 9. The first opening 48 in conjunction with the isolation bushing 42 allows the attachment of the acoustic insulation cover 68 to the electric motor while simultaneously providing noise decoupling between the acoustic insulation cover 68 and the electric motor.

The second opening 60 of the attachment portion 80 allows to include the attachment bushing 50 not shown in FIGS. 6 to 9. In this way, the attachment portion 80 can be attached to the chassis, while being simultaneously decoupled from the chassis.

Figure 9:
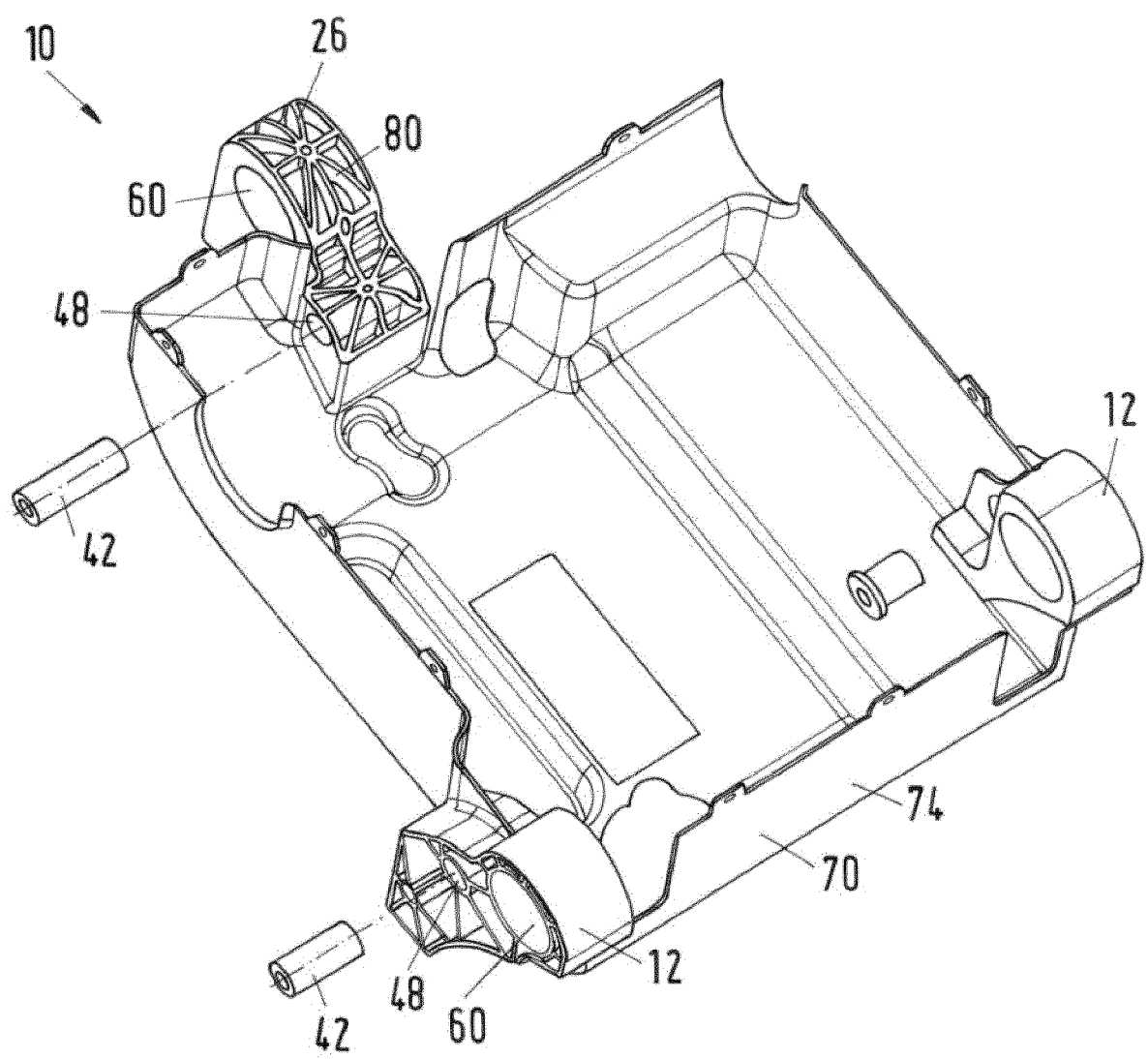
FIG. 9 shows a bottom view of a first insulation half shell of the acoustic insulation cover of FIG. 6.

The attachment portion 80 may also include ribs 26 (see FIG. 9). The attachment portion 80 is also a hollow member reinforced by the ribs 26. However, in contrast to the bracket 10, the attachment portion 80 does not exhibit a two-part structure as the bracket 10, but is a unitary member.

Beneficial aspects of the bracket 10 will be discussed in the following. Due to the configuration of the bracket 10 as being made by two half shells 12, 14 potentially reinforced by ribs 26, the bracket 10 is lightweight while still providing sufficient strength for supporting the electric motor. The lightweight aspect of the bracket 10 is further provided by manufacturing the bracket 10 from a plastic material. The characteristics of the plastic material in conjunction with configuration of the bracket 10 as a hollow member reinforced by ribs 26 allows to dampen/absorb vibrations generated by the electric motor in a frequency range between 750 and 2000 Hz.

The damper 28 is capable of absorbing/dampening vibrations in the frequency range between 400 and 750 Hz. Since the first resilient member 32 of the damper 28 can be made in a dual injection process with the first half shell 12 and/or the second half shell 14, respectively, the manufacturing of the damper 28 is simplified.

The isolation bushing 42 provides a damping/absorbing characteristic in the frequency range between 100 and 400 Hz. To this end, the weight of the electric motor in conjunction with the stiffness of the second resilient member 46 provides the damping/absorbing characteristics. Here again, the manufacturing of the isolation bushing 42 is simplified by the dual injection process of the second half shell 14 and the second resilient member 46.

A damping/absorbing of the vibration generated by the electric motor in the frequency range between 1 Hz and 400 Hz is achieved by the attachment bushing 50. The attachment of the attachment bushing 50 to the bracket 10 is simple, since the bushing 50 is positively locked by attaching the first half shell 12 to the second half shell 14. Consequently, no additional means for attaching the attachment bushing 50 to the bracket 10 are necessary.

Overall, preferred embodiments of the bracket 10 provide a complete damping/absorption of vibrations generated by the electric motor over a frequency range between 1 Hz and 2000 Hz. Basically, all vibrations generated by the electric motor may be attenuated by the bracket 10 in its preferred embodiments. Furthermore, the assembly process of the bracket 10 as well as the optional components (damper 28, isolation bushing 42 and/or attachment bushing 50) can be simplified due to the half shell structure of the bracket 10.

The manufacturing process of the bracket 10 in its preferred embodiment is described in the following. The first half shell 12 is manufactured in a molding process, whereby preferably the second part 36 of the first resilient member 32 is simultaneously manufactured by a dual injection process. Similarly, the second half shell 14 is molded, whereby preferably the first resilient member 32 and second resilient member 46 are simultaneously molded in a dual injection process.

After the molding of the second half shell 14, the oscillating mass 30 of the damper 28 is inserted into the first part 34 of the first resilient member 32. Additionally, the body 44 of the isolation bushing 42 is inserted into the second resilient member 46. Finally, the attachment bushing 50 is inserted into the second opening 60.

After that, the first half shell 12 is fixed to the second half shell 14, preferably by hot gas welding. By the fixation of the first half shell 12 to the second half shell 14, the oscillating mass 30 is positively locked in the first resilient member 32, while the attachment bushing 50 is also positively locked in the second opening 60 due to the presence of the protrusions 64. This means, the assembly process of the bracket 10 does not require additional screws or other attachment means. This simplifies the attachment process and reduces the number of components.

The invention claimed is:

1. A bracket for supporting an electric motor on a chassis of a vehicle, the bracket comprising:
    a first half shell defining a first half space,
    a second half shell defining a second half space,
    at least one isolation bushing for attaching the bracket to said electric motor, and
    at least one attachment bushing for attaching the bracket to said chassis;
    wherein the first half shell and the second half shell are comprised of a plastic material or a polymer material; the first half shell and the second half shell are fixed to each other, such that the first half shell and the second half shell define a cavity within the bracket; and the cavity includes the first half space and the second half space.

2. The bracket of claim 1, wherein the first half shell and the second half shell are fixed to each other by welding.

3. The bracket of claim 1, wherein the first half shell and/or the second half shell are reinforced by ribs.

4. The bracket of claim 3, wherein the ribs are formed as one piece with the first half shell and/or the second half shell.

5. The bracket of claim 1, including a damper provided in the cavity.

6. The bracket of claim 5, wherein the damper comprises an oscillating mass and a first resilient member attached to the bracket and the oscillating mass.

7. The bracket of claim 6, wherein the first resilient member is made from an elastic material, and the first resilient member comprises a layer which surrounds the oscillating mass.

8. The bracket of claim 7, wherein the first resilient member is arranged between the oscillating mass and a damper wall which is formed as one piece with the first half shell and/or the second half shell.

9. The bracket according to claim 1, wherein the isolation bushing comprises a body made from a rigid material to be connected to the electric motor and a second resilient member surrounding the body.

10. The bracket according to claim 9, wherein the second resilient member is arranged between the body and an inner surface of a first opening in the bracket.

11. The bracket according to claim 1, wherein the bracket comprises a second opening which includes protrusions arranged at axial ends of the second opening and extending into the second opening for positively locking the attachment bushing into the second opening in connection with fixing the first half shell to the second half shell.

12. The bracket according to claim 11, wherein the at least one attachment bushing comprises a plastic sleeve configured to be connected to the chassis and a rubber member surrounding the sleeve.

13. The bracket of claim 11, including at least two attachment bushings, each arranged in respective second openings.

14. The bracket of claim 13, wherein the at least two attachment bushings differ in their shape and/or material.

15. The bracket of claim 13, wherein at least one attachment bushing comprises at least one arm inserted into a radially extending recess of the second opening, and the at least two attachment bushings differ in the orientation of the at least one arm.

16. The bracket according to claim 1, including an acoustic insulation cover shaped to surround the electric motor, wherein the acoustic insulation cover is fixedly attached to the bracket.

17. The bracket according to claim 16, wherein the acoustic insulation cover includes a first insulation half shell and a second insulation half shell, wherein the first insulation half shell and the first half shell are a one-piece unitary component.

18. The bracket of claim 16, wherein the acoustic insulation cover includes an attachment portion for attaching the acoustic insulation cover to the chassis and/or to the electric motor, and the attachment portion includes an isolation bushing and/or an attachment bushing.

19. A method for manufacturing a bracket as recited in claim 1 for supporting an electric motor on a chassis of a vehicle, the method comprising:
    a) making the first half shell defining the first half space and the second half shell defining the second half space, wherein the first half shell and the second half shell are made from a plastic material, and
    b) fixing the first half shell to the second half shell, such that the first half shell and the second half shell define the cavity within the bracket.

20. The method of claim 19, wherein step a) includes manufacturing a first resilient member of a damper together with the second half shell by means of a dual injection process, and attaching an oscillating mass of the damper to the first resilient member.

21. The method of claim 19, wherein step a) includes providing at least one first opening in the first half shell and the second half shell, wherein an inner surface of the first opening is covered by a second resilient member, and wherein the second resilient member and the second half shell are manufactured in a dual injection process.

22. The method of claim 19, wherein, prior to step b), at least one attachment bushing for attaching the bracket to the chassis is inserted into a portion of a second opening which is arranged in the first half shell and/or the second half shell, and wherein the second opening includes protrusions arranged at axial ends of the second opening and extending into the second opening for positively locking the attachment bushing into the second opening in connection with fixing the first half shell to the second half shell.

* * * * *